United States Patent
Ng

(10) Patent No.: US 8,361,643 B2
(45) Date of Patent: Jan. 29, 2013

(54) BATTERY COVER LATCH MECHANISM AND PORTABLE ELECTRONIC DEVICE USING SAME

(75) Inventor: Lee-Han Ng, Shenzhen (CN)

(73) Assignee: FIH (Hong Kong) Limited, Kowloon (HK)

( * ) Notice: Subject to any disclaimer, the term of this patent is extended or adjusted under 35 U.S.C. 154(b) by 841 days.

(21) Appl. No.: 12/486,880

(22) Filed: Jun. 18, 2009

(65) Prior Publication Data

US 2010/0075212 A1 Mar. 25, 2010

(30) Foreign Application Priority Data

Sep. 24, 2008 (CN) .......................... 2008 1 0304635

(51) Int. Cl.
*H01M 2/10* (2006.01)
*H05K 5/00* (2006.01)

(52) U.S. Cl. ............ 429/97; 429/96; 429/100; 429/164; 429/177; 361/679.58; 361/747

(58) Field of Classification Search .................... 429/96, 429/97, 100, 164, 177; 361/679.58, 747
See application file for complete search history.

(56) References Cited

U.S. PATENT DOCUMENTS

| 5,895,729 | A  | * | 4/1999  | Phelps et al. ..................... 429/97 |
| 6,641,432 | B1 | * | 11/2003 | Ouyoung ....................... 439/500 |
| 7,068,495 | B2 | * | 6/2006  | Luo et al. .................. 361/679.56 |
| 2006/0148442 | A1 | * | 7/2006 | Liu et al. ........................ 455/347 |
| 2006/0166083 | A1 | * | 7/2006 | Zhang et al. ..................... 429/97 |
| 2007/0031727 | A1 | * | 2/2007 | Hsu ................................. 429/97 |

* cited by examiner

*Primary Examiner* — Patrick Ryan
*Assistant Examiner* — Alex Usyatinsky
(74) *Attorney, Agent, or Firm* — Altis Law Group, Inc.

(57) ABSTRACT

A battery cover latch mechanism includes a battery cover forming a first clasp, a main body, a button forming a second clasp latching to the first clasp; and a resilient member assembled on the button. The main body includes an assembly portion defining a notch; and a button hole communicating with the notch. The button and the resilient member are slidably assembled in the assembly portion, the resilient member seals the notch. The invention also discloses an electronic device using the battery cover latch mechanism.

1 Claim, 7 Drawing Sheets

BATTERY COVER LATCH MECHANISM AND PORTABLE ELECTRONIC DEVICE USING SAME

BACKGROUND

1. Technical Field

The disclosure relates to battery cover latch mechanisms used in portable electronic devices.

2. Description of Related Art

Portable electronic devices usually include latch mechanisms to latch battery covers to housings. The latch mechanisms are used to allow frequent installation and removal of batteries.

A typical latch mechanism includes an ejector made of metal, a button having a latching portion configured for latching to a cover and an elastic part latching between the button and a main body of a housing. The ejector is positioned between the main body and the cover, and configured for ejecting the cover. However, the latch mechanism doesn't have water proof capability. Thereby, water may get into the portable electronic devices and damage electronic components.

Therefore, there is room for improvement within the art.

BRIEF DESCRIPTION OF THE DRAWINGS

Many aspects of a battery cover latch mechanism and a portable electronic device using the battery cover latch mechanism can be better understood with reference to the following drawings. The components in the drawings are not necessarily to scale, the emphasis instead being placed upon clearly illustrating the principles of the present battery cover latch mechanism and a portable electronic device using the battery cover latch mechanism. Moreover, in the drawings, like reference numerals designate corresponding parts throughout the several views.

DETAILED DESCRIPTION OF THE EMBODIMENTS

Figure 1:
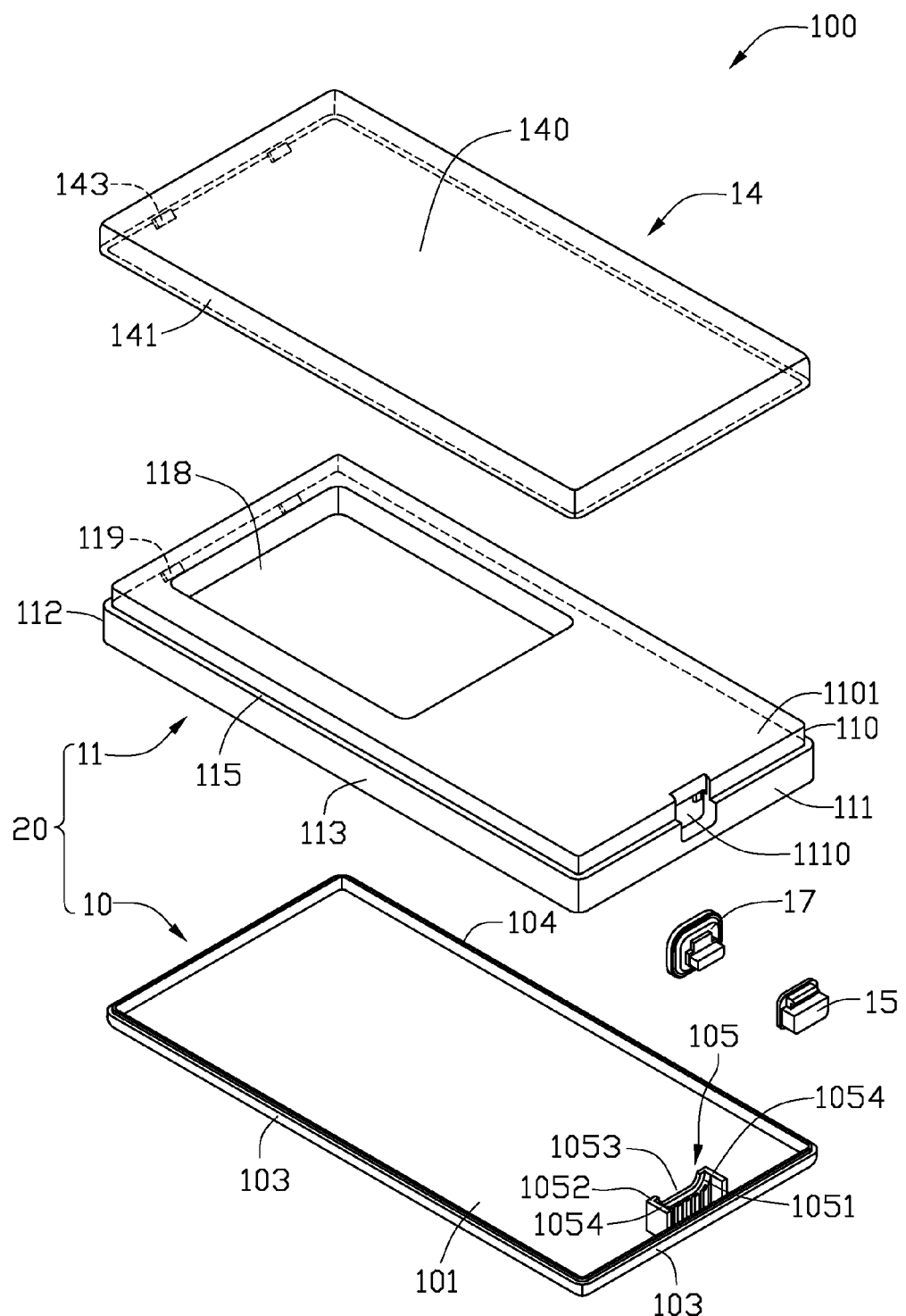
FIG. 1 is an exploded perspective view of a portable electronic device using a battery cover latching mechanism according to the exemplary embodiment.
Figure 2:
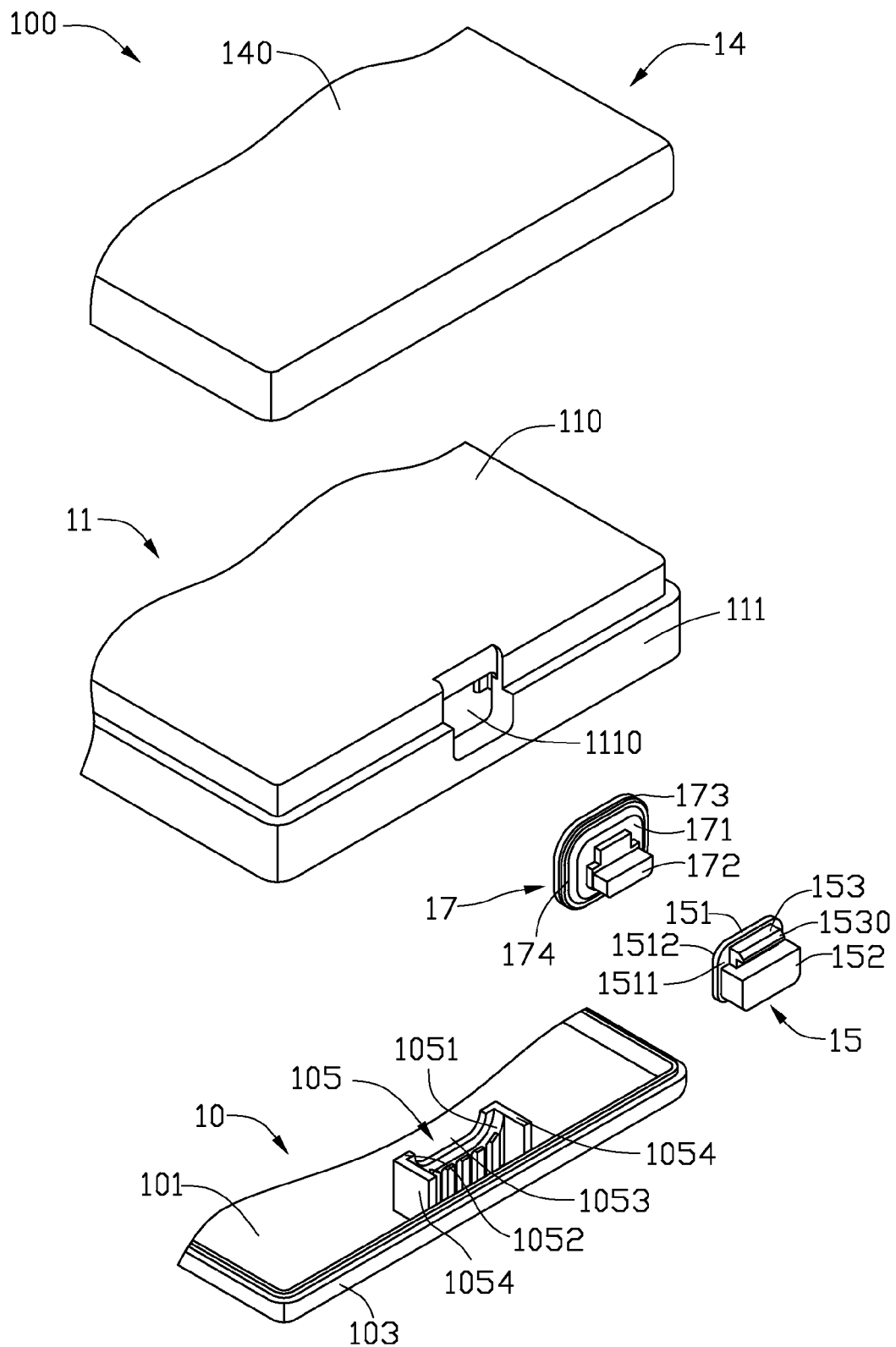
FIG. 2 is a partial and enlarged view of FIG. 1.
Figure 3:
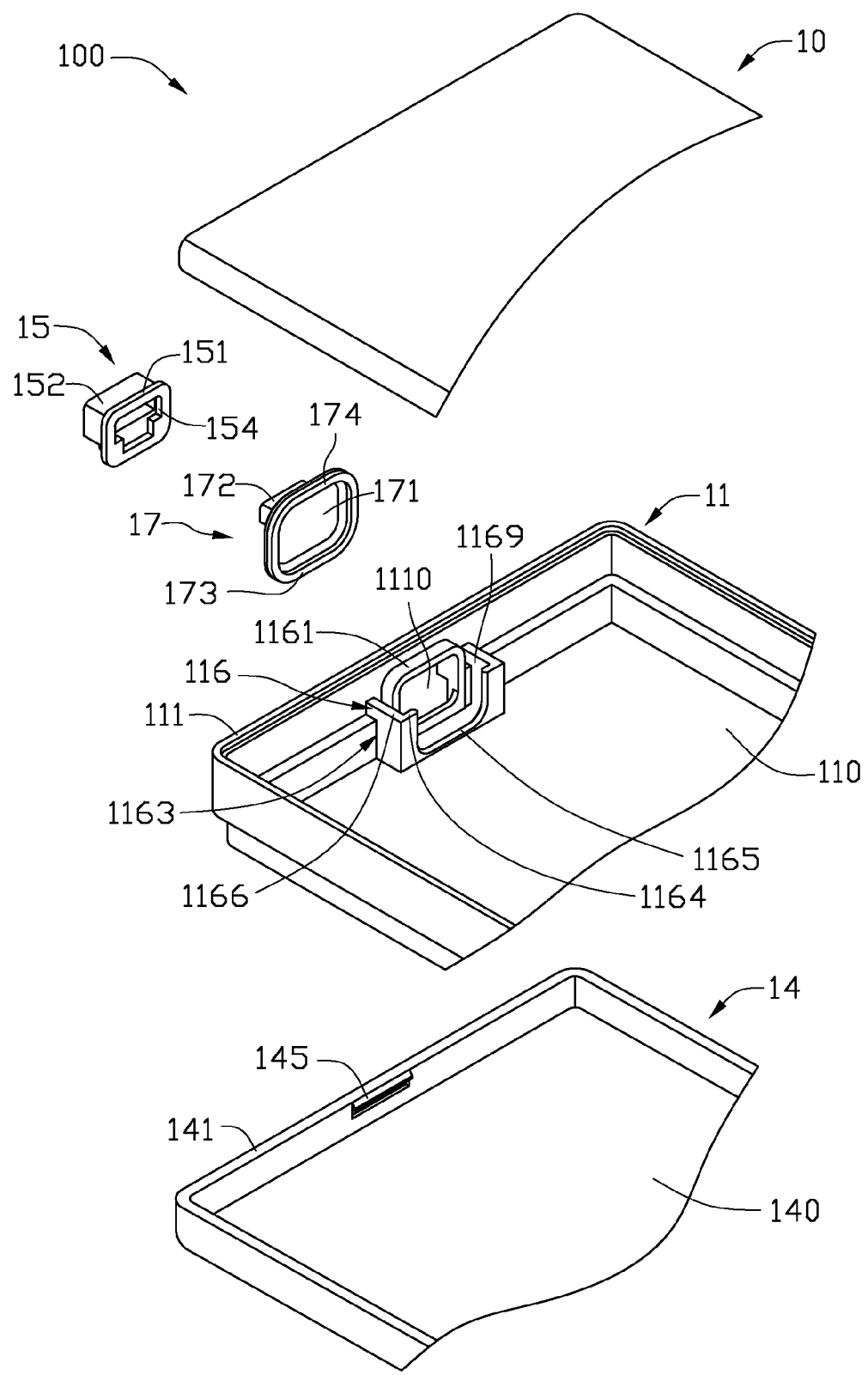
FIG. 3 is similar to FIG. 2, but viewed from anther angle.

Referring to the drawings, FIG. 1 to FIG. 3 show a battery cover latch mechanism 100 applied in a portable electronic device. The battery cover latch mechanism 100 includes a main body 20, a battery cover 14, a button 15, and a resilient member 17.

The main body 20 includes a housing 11 and a bottom cover 10 latching to the housing 11. The bottom cover 10 includes a panel 101, a peripheral wall 103 perpendicularly bent away from the panel 101, and a first assembly portion 105. The first assembly portion 105 is positioned on the panel 101 and abuts against the peripheral wall 103. The first assembly portion 105 includes a first wall portion 1052 facing the peripheral wall 103, and two first sidewall portions 1054. The first sidewall portions 1054 connect the first wall portion 1052 to the peripheral wall 103. The first wall portion 1052 has a first notch 1053 defined in an edge thereof. The first wall portion 1052 further defines a first receiving portion 1051 for accommodating the resilient member 17.

The housing 11 includes a top wall 110 defining a receiving slot 118 for removably receiving the battery, a first end wall 111, a second end wall 112 opposite to the first end wall 111, two opposite sidewalls 113 respectively perpendicularly bent away from the top wall 110, a mating portion 115, and a second assembly portion 116. The sidewalls 113 respectively connect to the first end wall 111 and the second end wall 112. The first end wall 111 defines a button hole 1110. The second end wall 112 defines two latching slots 119 therein. The mating portion 115 is recessed and defined in peripheral edges of the top wall 110. The second assembly portion 116 includes a latching wall 1161 and a second receiving portion 1163. The latching wall 1161 is positioned on the first end wall 111 and around the button hole 1110. The second receiving portion 1163 includes a second wall portion 1164, and two second sidewall portions 1166. The second wall portion 1164 is positioned on the top wall 110 and defines a second notch 1165 corresponding to the button hole 1110. The second sidewall portions 1166 connect the second wall portion 1164 to the first end wall 111. The first end wall 111 and the second receiving portion 1163 cooperatively define a receiving cavity 1169 communicating with the button hole 1110.

The battery cover 14 includes a main cover 140, a peripheral wall 141, two latching portions 143 corresponding to the latching slots 119, and a first clasp 145. The latching portions 143 are positioned on the peripheral wall 141, and are engagable in the latching slots 119. The clasp 145 is positioned on the peripheral wall 141 opposite to the latching portions 143. The first clasp 145 is latchable to the button 15.

The button 15 includes a main button 151, a pressing portion 152, a latching part 153, and a receiving chamber 154. The main button 151 is configured for resisting the latching wall 1161. The pressing portion 152 and the latching part 153 are positioned on the same side of the main button 151. The latching part 153 is positioned adjacent to the pressing portion 152, and includes a second clasp 1530 configured for latching to the first clasp 145. The receiving chamber 154 is T-shaped and defined in an opposite side of the main button 151 to the pressing portion 152.

The resilient member 17 can be made of soft material, such as rubber etc. The resilient member 17 includes a main sheet 171, a protruding block 172, a cushion 173, and a waterproof ring 174. The protruding block 172 is positioned on one side of the main sheet 171, and is engagable in the receiving chamber 154. The cushion 173 is ring-shaped positioned on an opposite side of the main sheet 171 to the protruding block 172. The waterproof ring 174 coils around the main sheet 171, and is matchable with the second sidewall portions 1166 and the first sidewall portions 1054, configured to prevent water entering into the portable electronic device.

Figure 4:
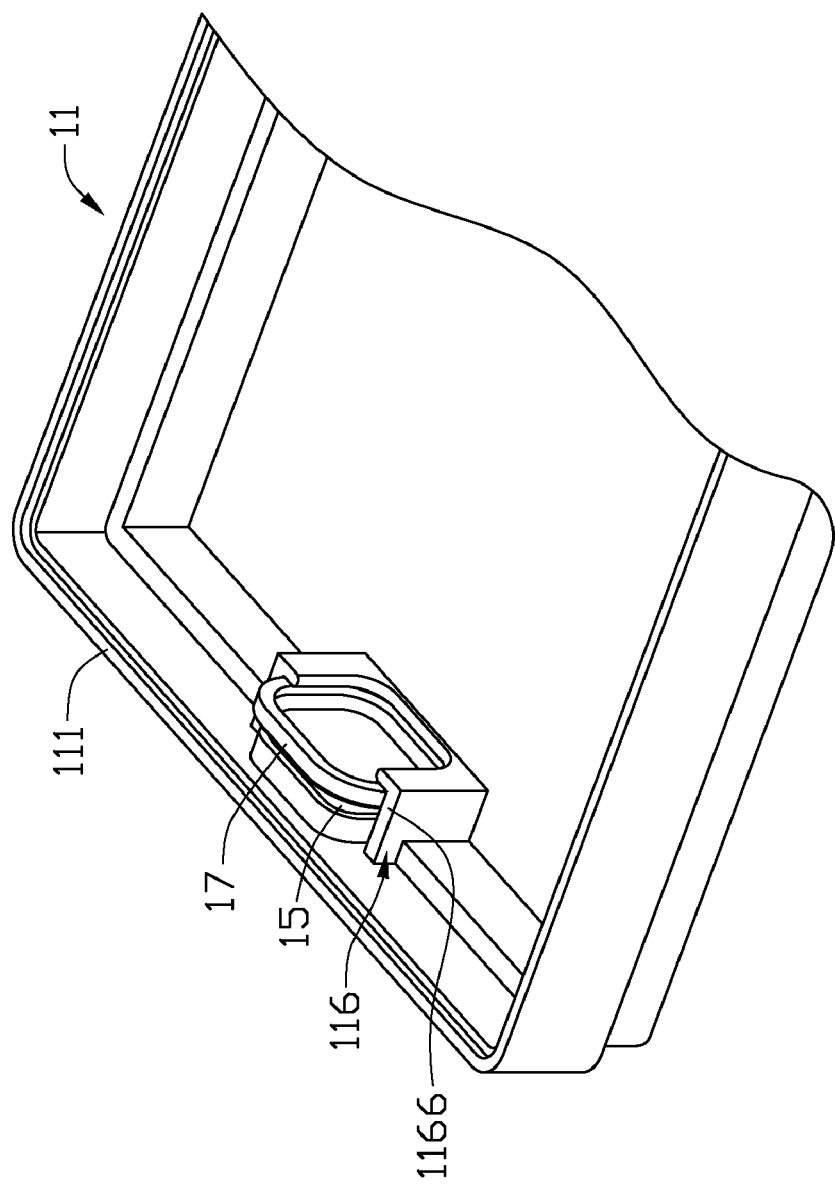
FIG. 4 is an assembled, perspective view of the portable electronic device using the battery cover latching mechanism of FIG. 3.
Figure 5:
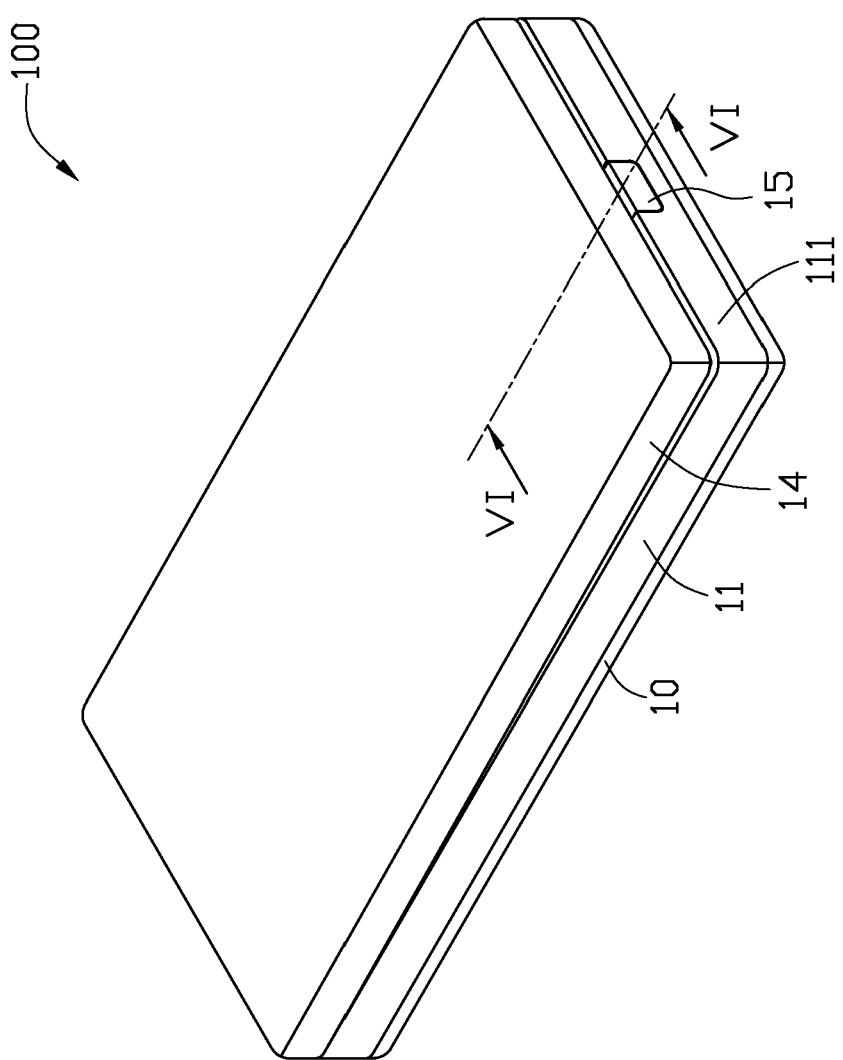
FIG. 5 is an assembled, perspective view of the portable electronic device using the battery cover latching mechanism.
Figure 6:
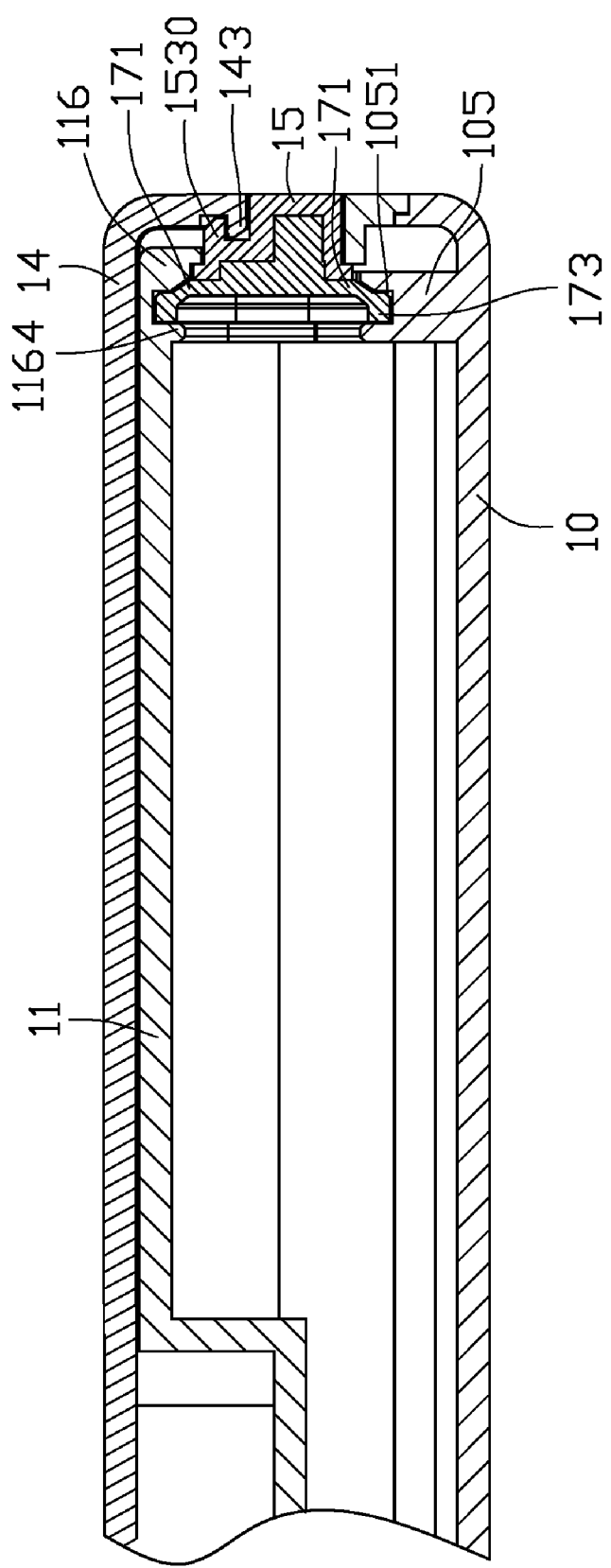
FIG. 6 is a cross-sectional view taken along line VI-VI of FIG. 5, showing the battery cover latching mechanism in locking condition.

Referring to the drawings FIG. 4 to FIG. 6, in assembly, the protruding block 172 engages in the receiving chamber 154, therefore, the resilient member 17 is assembled on the button 15. Then, the button 15 and the resilient member 17 are received in the receiving cavity 1169. The main button 151 resists the latching wall 1161, and the cushion 173 resists the second wall portion 1164. The waterproof ring 174 contacts tightly against the second sidewall portions 1166. The pressing portion 152 and the second clasp 1530 are exposed from the button hole 1110.

The bottom cover 10 covers the top wall 110. The main sheet 171 and the cushion 173 are received in the first receiving portion 1051. The waterproof ring 174 contacts tightly against the first sidewall portions 1054. Therefore, the resilient member 17 seals the second notch 1165 and the first notch 1053.

When the battery cover 14 is assembled on the housing 11, the battery cover 14 covers the top wall 110. The latching portions 143 latches to the latching slots 119, and the peripheral wall 141 latches to the mating portion 115. The first clasp 145 latches to the second clasp 1530.

Figure 7:
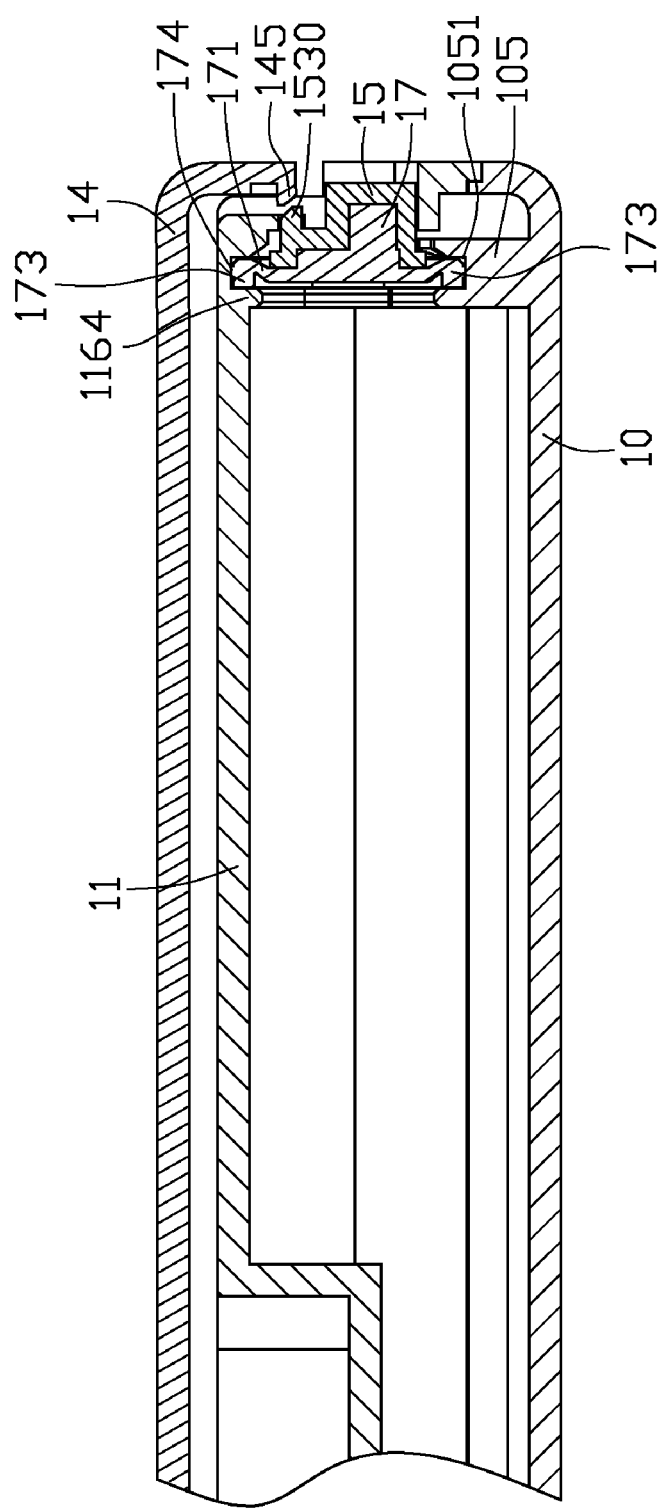
FIG. 7 is a cross-sectional view taken along line VI-VI of FIG. 5, showing the battery cover latching mechanism in unlocking condition.

Referring to the drawing FIG. 7, when opening the battery cover 14, the pressing portion 152 and the resilient member 17 are pressed by an external force. The first clasp 145 is detached from the second clasp 1530, thereby the battery cover 14 is in released condition. Meanwhile, the resilient member 17 generates an elastic force. When the external force is removed, the button 15 returns to original state by the elastic force of the resilient member 17.

The battery cover latch mechanism 100 includes the resilient member 17 assembled on the button 15. The resilient member 17 seals the second notch 1165 and the first notch 1053, thereby water can not enter the portable electronic device. Furthermore, the resilient member 17 provides resilient force to the button 15, the portable electronic device can omit elastic part, such as spring etc, thereby saving the space of the portable electronic device.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latch mechanism, comprising:
a battery cover comprising a first clasp positioned thereon;
a main body defining a battery receiving slot and comprising:
   an assembly portion defining a notch; and
   a button hole communicating with the notch;
a button comprising a main button, a pressing portion and a second clasp integrally formed together, the pressing portion and the second clasp positioned on a same side of the main button, and the pressing portion and the second clasp exposed from the button hole, the battery cover covering the second clasp and positioned on one side of the pressing portion, the second clasp latching to the first clasp; and
a resilient member assembled on the button;
wherein the button and the resilient member are slidably assembled in the assembly portion, and the resilient member seals the notch and the battery cover covers the battery receiving slot, the pressing portion is pressed toward a direction to force the second claps to move along the direction for unlocking with the first claps;
wherein the resilient member comprises a main sheet, a cushion positioned on one side of the main sheet, and a waterproof ring coiling around the main sheet, the waterproof ring is matchable with the assembly portion;
wherein the main body comprises a housing and a bottom cover latching to the housing, the assembly portion comprises a first assembly portion positioned on the bottom cover, and a second assembly portion positioned on the housing, the button and the resilient member are slidably assembled in the first assembly portion and the second assembly portion, the second assembly portion comprises a latching wall positioned around the button hole, the main button latches to the latching wall;
wherein the first assembly portion further comprises a first wall portion defining a first receiving portion and two first sidewall portions connected to the first wall portion, the second assembly portion comprises a second wall portion and two second sidewall portions connected to the second wall portion, the resilient member is received in the first receiving portion, and the waterproof ring matchable with the second sidewall portions and the first sidewall portion.

\* \* \* \* \*